(12) United States Patent
Yamagami

(10) Patent No.: US 7,457,514 B2
(45) Date of Patent: Nov. 25, 2008

(54) TELEVISION APPARATUS EMBEDDED WITH OPTICAL DISK DEVICE

(75) Inventor: Susumu Yamagami, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 741 days.

(21) Appl. No.: 11/140,955

(22) Filed: Jun. 1, 2005

(65) Prior Publication Data

US 2005/0270929 A1 Dec. 8, 2005

(30) Foreign Application Priority Data

Jun. 2, 2004 (JP) ............................ P2004-164030

(51) Int. Cl.
*H04N 5/70* (2006.01)

(52) U.S. Cl. .................. 386/46; 386/125; 386/126; 386/117; 386/95; 386/83; 386/1; 710/69; 710/260

(58) Field of Classification Search .................. 386/46, 386/117, 95, 83, 1, 125–126
See application file for complete search history.

(56) References Cited

U.S. PATENT DOCUMENTS

| | | | |
|---|---|---|---|
| 4,941,347 A * | 7/1990 | Iijima et al. ............... 73/116.02 |
| 5,146,493 A * | 9/1992 | Kiguchi et al. ......... 379/357.01 |
| 5,673,117 A * | 9/1997 | Ezumi et al. ................. 358/400 |
| 5,909,488 A * | 6/1999 | Koizumi et al. ......... 379/376.02 |
| 6,112,269 A * | 8/2000 | Nordling ...................... 710/69 |
| 6,493,780 B2 * | 12/2002 | Hsu ........................... 710/260 |
| 6,903,835 B1 * | 6/2005 | Naoi .......................... 358/1.15 |

FOREIGN PATENT DOCUMENTS

| | | |
|---|---|---|
| JP | 8-286770 | 11/1996 |
| JP | 2002-204321 | 7/2002 |
| JP | 2004-023894 | 1/2004 |

\* cited by examiner

*Primary Examiner*—Thai Tran
*Assistant Examiner*—Helen Shibru
(74) *Attorney, Agent, or Firm*—Morgan, Lewis & Bockius LLP

(57) ABSTRACT

An television apparatus embedded with an optical disk device includes a television unit having a microcomputer for a television and a power source for a television and an optical disk unit having a microcomputer for an optical disk, a power source for the optical disk and an oscillation stop controller. When the output of a start signal from the microcomputer for the television is stopped, the oscillation stop controller detects that the output of the start signal is stopped to stop the supply of electric power to a primary side power source of the power source for the optical disk. The power source for the television supplies the electric power to the microcomputer for the optical disk in place of the power source for the optical disk in accordance with a control signal from the microcomputer for the television.

5 Claims, 3 Drawing Sheets

FIG. 2

| | MICROCOMPUTER FOR TELEVISION | POWER SOURCE FOR TELEVISION | MICROCOMPUTER FOR OPTICAL DISK | POWER SOURCE FOR OPTICAL DISK | TOTAL |
|---|---|---|---|---|---|
| EMBODIMENT | 0.1 | 0.5 | 0.1 | 0.0 | 0.7 |
| CONVENTIONAL APPARATUS | 0.1 | 0.4 | 0.1 | 1.0 | 1.6 |

TELEVISION APPARATUS EMBEDDED WITH OPTICAL DISK DEVICE

BACKGROUND OF THE INVENTION

1. Field of the Invention

The present invention relates to a television apparatus embedded with an optical disk device that records and reproduces data on an optical disk for reproducing a television broadcasting signal.

2. Description of the Related Art

Conventionally, in a television apparatus or in an optical disk device, a microcomputer has a stand-by mode in which while a power is turned off while electric power is continuously supplied for starting a reserved image reproduction or a reserved image recording. In such a stand-by mode, there is a problem how electric power for the stand-by mode is suppressed. Thus, various kinds of devices for solving the problem have been devised (See JP-A-8-286770, JP-A-2002-204321, and JP-A-2004-023894).

The stand-by mode is similarly provided in an integral type apparatus such as the television apparatus embedded with an optical disk device. At this time, in such an integral type apparatus, microcomputers are respectively provided in functional parts. In the television apparatus, two microcomputers including a microcomputer for a television for controlling the function of the television apparatus and a microcomputer for the optical disk for controlling the function of the optical disk device are provided. The electric power is supplied respectively to the two microcomputers under the stand-by mode. Now, a schematic structure of a power supply system of a conventional television apparatus embedded with an optical disk device will be described by referring to FIG. 3.

FIG. 3 is a block diagram showing the schematic structure of the power supply system of the conventional television apparatus embedded with an optical disk device. In FIG. 3, a thick line arrow mark represents a power supply line and a thin line arrow mark represents a control signal line.

As shown in FIG. 3, the television apparatus includes in a casing member 1, a TV unit (television unit) 10 for reproducing a received television broadcasting signal and an optical disk unit (optical disk device) 20 for recording and reproducing the information of the optical disk.

The TV unit 10 includes a microcomputer (control unit) 11 for a television for controlling a television function, a power source 12 for a television for supplying electric power to the respective parts of the TV unit 10 and functional parts such as a display part 13 for displaying a reproduced image.

On the other hand, the optical disk unit 20 includes a microcomputer (control unit) 21 for the optical disk for controlling the recording and reproducing operations of the optical disk, a power source 22 for the optical disk for supplying electric power to respective functional parts in the optical disk unit 20 and a functional part such as a driving part 23 composed of a spindle motor or a stepping motor. Then, the entire part of the television apparatus is controlled by the microcomputer 11 for the television. At the time of a stand-by mode, the microcomputer 11 for the television outputs a stand-by mode signal to the microcomputer for the optical disk to respectively obtain the stand-by modes of the devices.

SUMMARY OF THE INVENTION

However, in the television apparatus, the microcomputer 21 for the optical disk is provided with a clock function for performing an operation for a prescribed time even during a power failure, a reserved image reproduction and a reserved image record separately from the microcomputer 11 for the television for performing a main control. A prescribed electric power is constantly supplied to the microcomputer 21 for the optical disk even under the stand-by mode. Then, the electric power is supplied from the power source 22 for the optical disk. Therefore, the electric power is also supplied to the power source 22 for the optical disk during the stand-by mode. However, the power source 22 for the optical disk supplies the electric power to the driving part such as the motor, so that the power source 22 for the optical disk has power consumption higher than that of other parts. Consequently, in the entire part of the optical disk incorporated television apparatus, the power consumption during the stand-by mode is undesirably increased. Thus, a value not higher than 1 W that is a reference value for energy saving cannot be achieved.

One of objects of the present invention to provide a television apparatus embedded with an optical disk device that suppresses power consumption during a stand-by mode.

According to a first aspect of the invention, there is provided a television apparatus including: 1) an optical disk device that records and reproduces an optical disk and having: a control unit for controlling the recording and reproducing operations; and a power source having a transducer for supplying electric power to parts provided in the optical disk device; 2) a television unit that receives and reproduces a television broadcasting signal and having: a control unit for controlling the reproducing operation and entire part of the television unit; and a power source for supplying electric power to parts provided in the television unit; and 3) a casing that accommodates the optical disk device and the television unit, wherein the television apparatus further comprising an electric power supply stopping unit that detects a stand-by mode in accordance with a start control signal outputted to the control unit in the optical disk from the control unit in the television unit, and stops the supply of the electric power to a primary side of the transducer of the power source in the optical disk device in the stand-by mode, wherein the power source in the television unit starts to supply the electric power to the control unit in the optical disk device when the electric power supply stopping unit stops the supply of the electric power to the primary side of the transducer, and wherein the control unit in the optical disk performs a low frequency oscillation when the electric power is supplied when in the stand-by mode.

According to a second aspect of the invention, there is provided television apparatus including: 1) an optical disk device that records and reproduces an optical disk and having: a control unit for controlling the recording and reproducing operations; an a power source having a transducer for supplying electric power to parts provided in the optical disk device; 2) a television unit that receives and reproduces a television broadcasting signal and having: a control unit for controlling the reproducing operation and entire part of the television unit; and a power source for supplying electric power to parts provided in the television unit; and 3) a casing that accommodates the optical disk device and the television unit, wherein the television apparatus further comprising an electric power supply stopping unit that stops the supply of the electric power to a primary side of the transducer of the power source in the optical disk device when in a stand-by mode, and wherein the power source in the television unit starts to supply the electric power to the control unit in the optical disk device when the electric power supply stopping unit stops the supply of the electric power to the primary side of the transducer.

According to a third aspect of the invention, there is provided a television apparatus including: 1) an optical disk device that records and reproduces an optical disk and having: control means for controlling the recording and reproducing operations; and a power source having a transducer for supplying electric power to parts provided in the optical disk device; 2) a television unit that receives and reproduces a television broadcasting signal and having: control means for controlling the reproducing operation and entire part of the television unit; and a power source for supplying electric power to parts provided in the television unit; and 3) a casing that accommodates the optical disk device and the television unit, wherein the television apparatus further comprising an electric power supply stopping means that detects a stand-by mode in accordance with a start control signal outputted to the control means in the optical disk from the control means in the television unit, and stops the supply of the electric power to a primary side of the transducer of the power source in the optical disk device in the stand-by mode, wherein the power source in the television means starts to supply the electric power to the control means in the optical disk device when the electric power supply stopping means stops the supply of the electric power to the primary side of the transducer, and wherein the control means in the optical disk performs a low frequency oscillation when the electric power is supplied when in the stand-by mode.

BRIEF DESCRIPTION OF THE DRAWINGS

The above objects and advantages of the present invention will become more apparent by describing preferred exemplary embodiments thereof in detail with reference to the accompanying drawings, wherein:

FIG. 2 is a table for comparing power consumption in a stand-by mode between the television apparatus according to the embodiment and a conventional apparatus.

DETAILED DESCRIPTION OF THE PREFERRED EMBODIMENTS

Now, a television apparatus embedded with an optical disk device according to an embodiment of the present invention will be described by referring to FIGS. 1 and 2.

Figure 1:
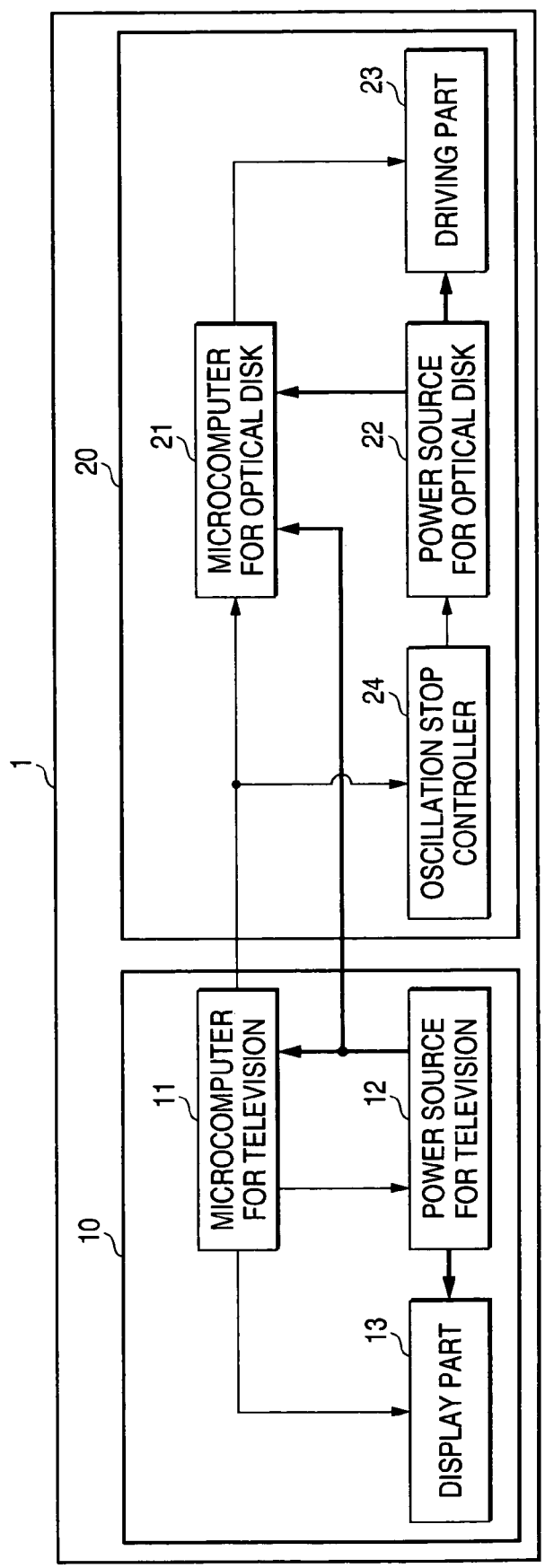
FIG. 1 is a block diagram showing a schematic structure of a power supply system of a television apparatus embedded with an optical disk device according to an embodiment of the present invention.
Figure 3:
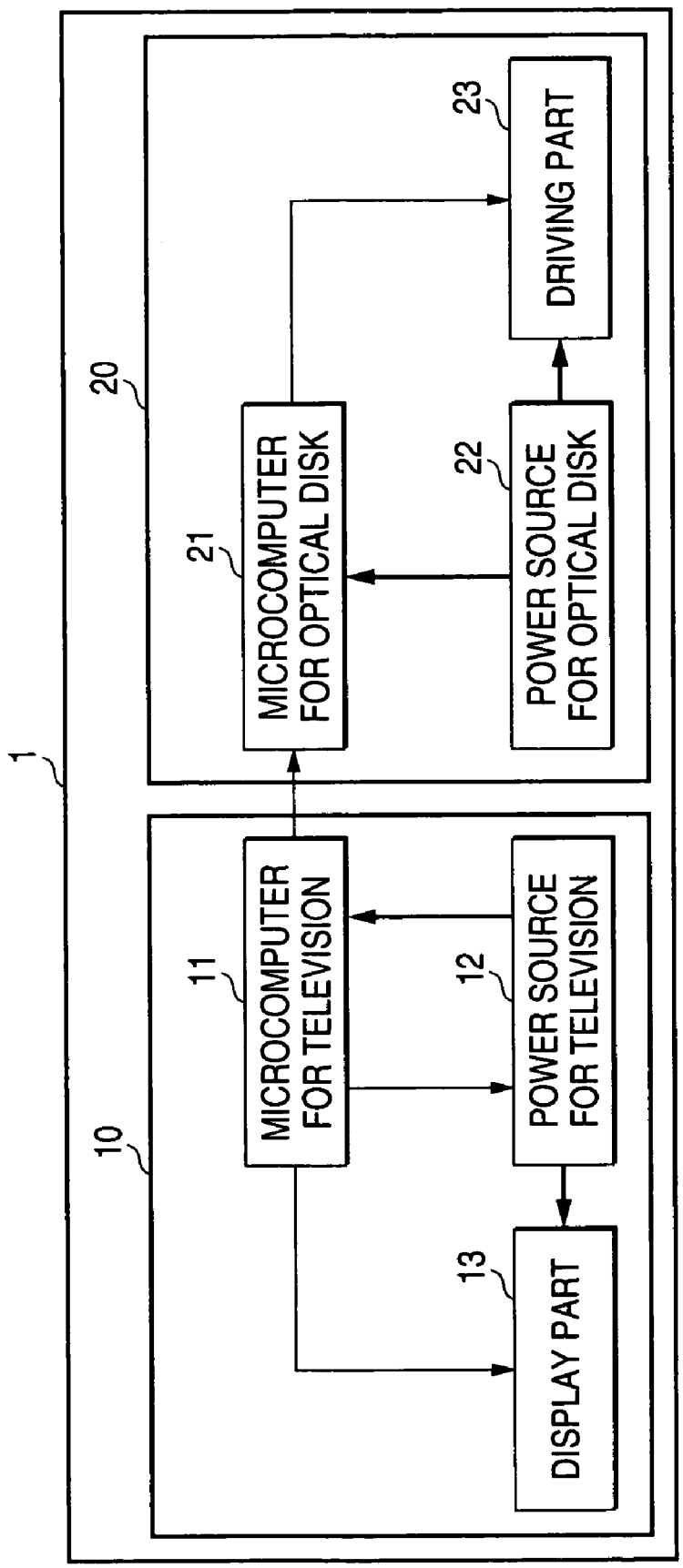
FIG. 3 is a block diagram showing a schematic structure of a power supply system of a conventional television apparatus embedded with an optical disk device.

FIG. 1 is a block diagram showing the schematic structure of the power supply system of the television apparatus according to the embodiment. In FIG. 1, a thick line arrow mark represents a power supply line and a thin line arrow mark represents a control signal line.

The television apparatus includes in a casing member 1, a TV unit 10 for reproducing a received television broadcasting signal and an optical disk unit 20 for recording and reproducing the information of the optical disk.

The TV unit 10 includes a microcomputer 11 for a television for controlling a television function, a power source 12 for a television for supplying electric power to the respective parts of the TV unit 10 and functional parts such as a display part 13 for displaying a reproduced image.

The optical disk unit 20 includes a microcomputer 21 for the optical disk for controlling the recording and reproducing operations of the optical disk, a power source 22 for the optical disk for supplying electric power to respective functional parts in the optical disk unit 20, a functional part such as a driving part 23 composed of a spindle motor or a stepping motor and an oscillation stop controller 24 for detecting a start signal outputted from the microcomputer 11 for the television of the TV unit 10 to stop the supply of the electric power to the power source 22 for the optical disk upon detecting no start signal. The oscillation stop controller 24 serves as an electric power supply stopping unit that stops the supply of the electric power to a primary side of the transducer of the power source in the optical disk device when in a stand-by mode.

The entire part of the television apparatus embedded with an optical disk device is controlled by the microcomputer 11 for the television.

A television viewing and listening operation, an optical disk reproducing operation and an optical disk recording operation of the above-described television apparatus will be described below.

When a start instruction is inputted from an operating unit such as a remote controller that is not shown in the drawing by a user, the microcomputer 11 for the television outputs the start signal respectively to the functional parts of the TV unit 10 and also outputs the start signal to the microcomputer 21 for the optical disk of the optical disk unit 20.

Then, when a television broadcasting viewing operation is inputted, a video signal and an audio signal of a channel designated from a received television broadcasting signal are reproduced by a television broadcasting signal reproducing unit that is not illustrated in the drawing in accordance with contents thereof (channel or the like) and outputted to the display part 13.

Further, when the optical disk on which the information is recorded is mounted on a loading part (not shown in the drawing) of the optical disk and a reproducing operation of the optical disk is inputted by an operating part, the microcomputer 11 for the television transmits an instruction of the reproducing operation to the microcomputer 21 for the optical disk. The microcomputer 21 for the optical disk controls the driving part 23 to reproduce the information of the optical disk. Specifically, when the spindle motor is rotated at a prescribed rotating speed and the stepping motor, a tracking actuator and a focus actuator are driven to read the information recorded on a recording surface of the optical disk by following a prescribed track of the optical disk having an optical pickup mounted thereon. The read information is converted into an electric signal. The electric signal is decoded to a prescribed data form to form video data and audio data. The video data and the audio data are outputted to the display part 13.

Further, when a writeable optical disk is mounted on the loading part of the optical disk and a recording operation is inputted to the optical disk by the operating part, the microcomputer 11 for the television transmits an instruction of the recording operation to the microcomputer 21 for the optical disk. The microcomputer 21 for the optical disk controls the driving part 23 to record on the optical disk. Here, when the video or the audio of a television broadcasting signal that is currently received are recorded, the microcomputer 11 for the television reproduces the video signal and the audio signal of a channel designated from the received television broadcasting signal by the television broadcasting signal reproducing unit and outputs the reproduced video signal and the audio signal to an optical disk recording unit in the optical disk unit 20. The microcomputer 21 for the optical disk performs a control for encoding the video and audio signals inputted to the optical disk recording unit and converting the encoded video and audio signals to data of a recording form of the optical disk. The optical disk recording unit outputs the data converted in accordance with the control to the optical pickup. The optical pickup converts the inputted data to an optical signal and applies the optical signal to the recording surface of the optical disk to record the information.

The above-described television apparatus embedded with an optical disk device has a clock function to continuously supply a power for a prescribed time upon power failure so that a reserved image reproduction or a reserved image recording can be carried out even when the power is turned off. In the TV unit 10, the clock function is provided in the microcomputer 11 for the television. In the optical disk unit 20, the clock function is provided in the microcomputer 21 for the optical disk. Accordingly, electric power needs to be constantly supplied not only to the microcomputer 11 for the television, but also to the microcomputer 21 for the optical disk.

Therefore, in the television apparatus embedded with an optical disk device according to the present invention, a below-described operation is carried out.

When a user inputs an operation of turning off the power (stand-by mode), the microcomputer 11 for the television stops the output of the start signal. That is, a signal of a prescribed High level changes to a signal of a Low level. In accordance with the signal, the power source 12 for the television shifts the supply of the electric power to the respective parts including the display part 13 in the TV unit 10 to low electric power for the stand-by mode.

Further, when the output of the start signal from the microcomputer 11 for the television is stopped, the oscillation stop controller 24 of the optical disk unit 20 detects the change of the signal to generate a signal for stopping the supply of the electric power to a primary side of a transducer provided in the power source 22 for the optical disk and output the signal to power source 22 for the optical disk. In the power source 22, a switch circuit is provided for stopping the supply of the electric power to the primary side of the transducer when this signal is inputted. The switch circuit receives an electric power supply stopping signal to stop the supply of the electric power to the primary side power source of the power source 22 for the optical disk.

At the same time, the microcomputer 11 for the television controls the power source 12 for the television to supply the electric power to the microcomputer 21 for the optical disk. The power source 12 for the television supplies the electric power in the stand-by mode to the microcomputer 21 for the optical disk in accordance with the control.

Further, at the same time, the microcomputer 21 for the optical disk detects that the input of the start signal from the microcomputer for the television is stopped to start an operation under a low frequency oscillation. At this time, the electric power is supplied to the microcomputer 21 for the optical disk from the power source 12 for the television in place of the power source 22 for the optical disk.

According to this structure, since the power source 22 for the optical disk does not operate upon stand-by mode, power consumption is greatly suppressed. At this time, to maintain the operation of the microcomputer 21 for the optical disk, the electric power is supplied from the power source 12 for the television. However, since the microcomputer 21 for the optical disk originally has a low electric power consumption, the power consumption increased in the power source 12 for the television hardly increases.

FIG. 2 is a table showing the power consumption during the stand-by mode in the apparatus of this embodiment and a usual apparatus.

As shown in FIG. 2, the electric power consumed in the microcomputer 11 for the television and the microcomputer 21 for the optical disk is 0.1 W and does not change in the apparatus of this embodiment and the usual apparatus. However, since, in the apparatus of this embodiment, the electric power is not supplied to the power source 22 for the optical disk, the power consumption of the power source 22 for the optical disk that has been hitherto 1.0 W is 0 W. That is, in the apparatus of this embodiment, the electric power is not consumed in the power source 22 for the optical disk during the stand-by mode. At this time, since the power source 12 for the television supplies the electric power to the microcomputer 21 for the optical disk, the power source 12 for the television has the power consumption increased more by 0.1 W than that of the usual apparatus. However, since the power consumption of the power source 22 for the optical disk is decreased by 1.0 W, the total of the power consumption of 1.6 W during the stand-by mode in the usual apparatus is reduced to 0.7 W. Thus, the power consumption can be reduced more than 1.0 W as a target reference of an energy saving mode.

Namely, the television apparatus embedded with an optical disk device in which a power consumption upon stand-by mode is suppressed can be formed.

In the embodiment, upon waiting for the input of the power, that is, upon stand-by mode, since the electric power is not supplied to the power source for the optical disk, the electric power is not consumed in the power source for the optical disk. At this time, since the power source for the television supplies the electric power to the control unit for the optical disk, the control unit for the optical disk operates under the stand-by mode even when the electric power is not supplied from the power source for the optical disk.

According to the embodiment, when the start control signal outputted to the control unit for the optical disk from the control unit for the television, for instance, a Hi signal of prescribed voltage is not detected, it is decided that a mode is a power off mode, that is, the stand-by mode so that the supply of the electric power to the power source for the optical disk is stopped. Thus, the control unit for the television for controlling the entire part of the apparatus does not need to generate a special power stop signal so that a control is easily performed.

According to the embodiment, the low frequency oscillation is carried out during the stand-by mode, so that the electric power consumed by the control unit for the optical disk is suppressed. Thus, the power consumption in the stand-by mode can be more reduced.

According to the embodiment, when the mode is switched to the stand-by mode, the electric power is not supplied to the power source for the optical disk whose power consumption has been hitherto the highest. Accordingly, in the power source for the optical disk, the electric power is not consumed. Thus, the power consumption during the stand-by mode is greatly decreased. At this time, since the electric power is supplied to the control unit for the optical disk from the power source for the television, the stand-by mode of the optical disk device (optical disk unit) is maintained. That is, the television apparatus embedded with an optical disk device can be formed in which the stand-by mode having a low power consumption is provided.

Although the present invention has been shown and described with reference to the embodiment, various changes and modifications will be apparent to those skilled in the art from the teachings herein. Such changes and modifications as are obvious are deemed to come within the spirit, scope and contemplation of the invention as defined in the appended claims.

What is claimed is:

1. A television apparatus comprising:
   1) an optical disk device that records and reproduces an optical disk and having:
      a control unit for controlling the recording and reproducing operations; and
      a power source having a transducer for supplying electric power to parts provided in the optical disk device;
   2) a television unit that receives and reproduces a television broadcasting signal and having:
      a control unit for controlling the reproducing operation and entire part of the television unit; and
      a power source for supplying electric power to parts provided in the television unit; and
   3) a casing that accommodates the optical disk device and the television unit,
   wherein the television apparatus further comprising an electric power supply stopping unit that detects a stand-by mode in accordance with a start control signal outputted to the control unit in the optical disk from the control unit in the television unit, and stops the supply of the electric power to a primary side of the transducer of the power source in the optical disk device in the stand-by mode,
   wherein the power source in the television unit starts to supply the electric power to the control unit in the optical disk device when the electric power supply stopping unit stops the supply of the electric power to the primary side of the transducer, and
   wherein the control unit in the optical disk performs a low frequency oscillation when the electric power is supplied when in the stand-by mode.

2. A television apparatus comprising:
   1) an optical disk device that records and reproduces an optical disk and having:
      a control unit for controlling the recording and reproducing operations; and
      a power source having a transducer for supplying electric power to parts provided in the optical disk device;
   2) a television unit that receives and reproduces a television broadcasting signal and having:
      a control unit for controlling the reproducing operation and entire part of the television unit; and
      a power source for supplying electric power to parts provided in the television unit; and
   3) a casing that accommodates the optical disk device and the television unit,
   wherein the television apparatus further comprising an electric power supply stopping unit that stops the supply of the electric power to a primary side of the transducer of the power source in the optical disk device when in a stand-by mode, and
   wherein the power source in the television unit starts to supply the electric power to the control unit in the optical disk device when the electric power supply stopping unit stops the supply of the electric power to the primary side of the transducer.

3. The television apparatus according to claim 2, wherein the electric power supply stopping unit stops the supply of the electric power to the primary side of the transducer in accordance with a detected result of a start control signal outputted to the control unit in the optical disk from the control unit in the television unit.

4. The television apparatus according to claim 2, wherein the control unit in the optical disk performs a low frequency oscillation when the electric power is supplied when in the stand-by mode.

5. A television apparatus comprising:
   1) an optical disk device that records and reproduces an optical disk and having:
      control means for controlling the recording and reproducing operations; and
      a power source having a transducer for supplying electric power to parts provided in the optical disk device;
   2) a television unit that receives and reproduces a television broadcasting signal and having:
      control means for controlling the reproducing operation and entire part of the television unit; and
      a power source for supplying electric power to parts provided in the television unit; and
   3) a casing that accommodates the optical disk device and the television unit,
   wherein the television apparatus further comprising an electric power supply stopping means that detects a stand-by mode in accordance with a start control signal outputted to the control means in the optical disk from the control means in the television unit, and stops the supply of the electric power to a primary side of the transducer of the power source in the optical disk device in the stand-by mode,
   wherein the power source in the television means starts to supply the electric power to the control means in the optical disk device when the electric power supply stopping means stops the supply of the electric power to the primary side of the transducer, and
   wherein the control means in the optical disk performs a low frequency oscillation when the electric power is supplied when in the stand-by mode.

* * * * *